United States Patent
Berry

[15] 3,698,790
[45] Oct. 17, 1972

[54] STABILIZED OPTICAL SYSTEMS
[72] Inventor: Peter John Berry, Glasgow, Scotland
[73] Assignee: Barr and Stroud Limited, Glasgow, Scotland
[22] Filed: Aug. 31, 1971
[21] Appl. No.: 176,535

[30] Foreign Application Priority Data
Nov. 18, 1970 Great Britain..........54,781/70

[52] U.S. Cl. .....................350/16, 356/248, 95/12.5
[51] Int. Cl. ............................................G02b 23/02
[58] Field of Search ..350/16; 95/12.5; 356/148, 149, 356/248, 250

[56] References Cited
UNITED STATES PATENTS
1,553,078  9/1925  Henderson ................356/248
1,709,314  4/1929  Henderson ................356/248
3,612,643  10/1971  Weber ......................350/16 X Primary Examiner—David H. Rubin
Attorney—Mason, Fenwick & Lawrence

[57] ABSTRACT

A stabilized optical system comprising a servo-stabilized platform mounted on a support for rotation about a first axis, an objective system secured to said platform, and a mirror mounted on said platform for rotation about said first axis, the reflecting surface of said mirror containing said first axis, the objective system being so located that the focal point thereof lies on said reflecting surface, and the first axis passing through said focal point, and a driving connection between the mirror and the platform whereby the angular movement of the mirror is related to that of the objective system so that a light beam received at said objective system is projected by said mirror along a second axis which is fixed in position with respect to the support.

8 Claims, 7 Drawing Figures

Inventor
PETER JOHN BERRY
By
Mason, Fenwick & Lawrence
Attorneys

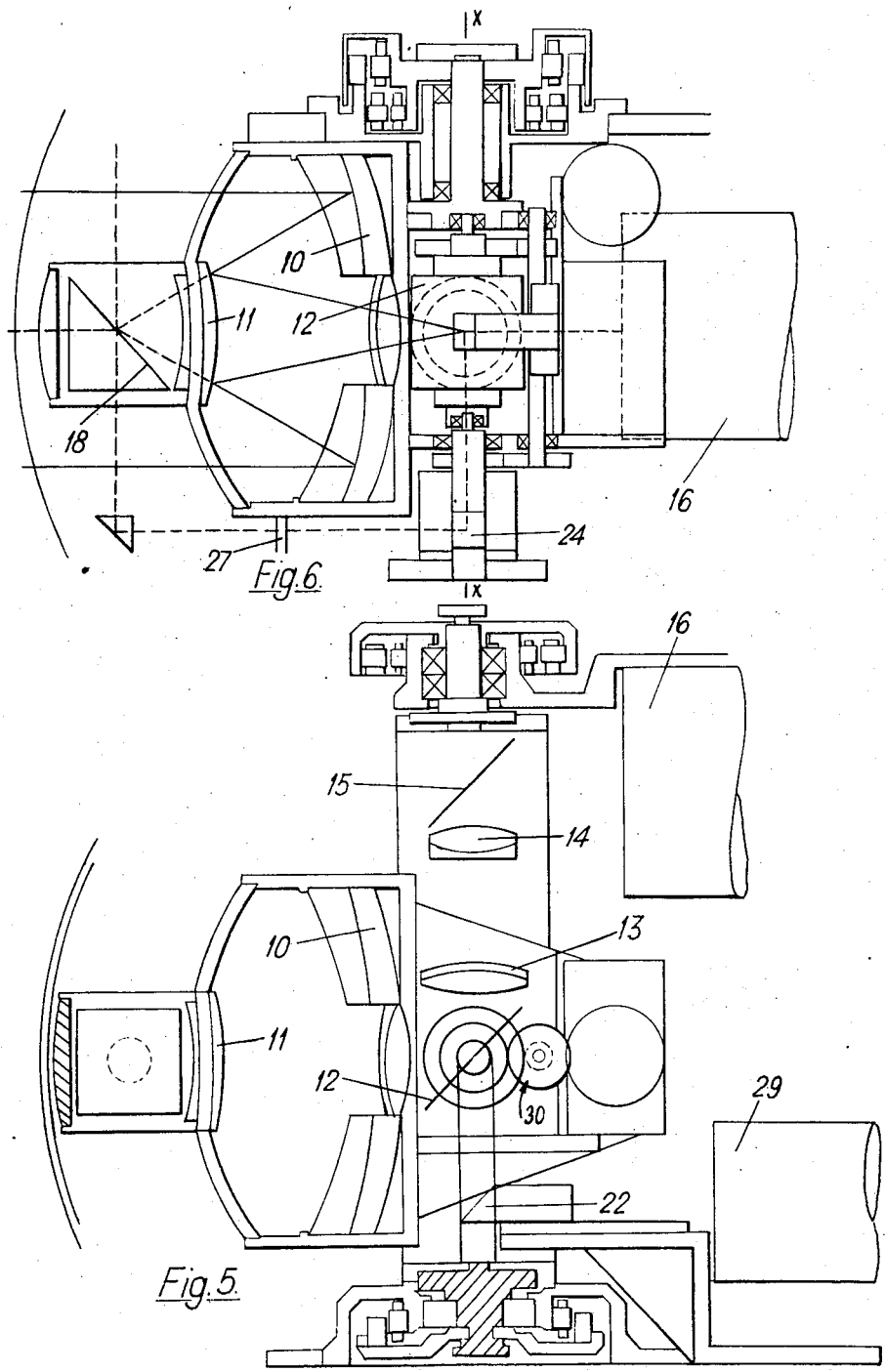

STABILIZED OPTICAL SYSTEMS

This invention relates to stabilized optical systems.

In moving vehicles such as motor cars, aircraft, and the like, it is sometimes required to take a cine film or television picture of, or otherwise monitor a distant object, and it is desirable that the line of sight, i.e. the line between the camera or monitoring apparatus mounted on the vehicle and the object should remain relatively constant despite movement of the vehicle.

It is known to stabilize the line of sight by mounting the camera or monitoring apparatus and associated lens systems on a stabilized platform. However, a disadvantage with this system is that it is very bulky.

It is also known to stabilize the line of sight by projecting the image of the object via a mirror on to the camera or monitoring apparatus and to stabilize the mirror using a servo control system. However, a disadvantage with this system is that the mirror has a very low inertia and is not inherently inertially stable, so that the servo control system is required over the full range of vibration frequencies experienced by the vehicle.

An object of the present invention is to obviate or mitigate the above disadvantages.

According to the present invention there is provided a stabilized optical system comprising a servo-stabilized platform mounted on a support for rotation about a first axis, an objective system secured to said platform, and a mirror mounted on said platform for rotation about said first axis, the reflecting surface of said mirror containing said first axis, the objective system being so located that the focal point thereof lies on said reflecting surface, and the first axis passing through said focal point, and a driving connection between the mirror and the platform whereby the angular movement of the mirror is related to that of the objective system so that a light beam received at said objective system is projected by said mirror along a second axis which is fixed in position with respect to the support.

Embodiments of the present invention will now be described, by way of example, with reference to the accompanying drawings, in which:

FIGS. 5, 6 and 7 are respectively elevation, plan and side views of apparatus incorporating a laser transmitting and receiving system and an optical system according to the present invention.

Figure 1:
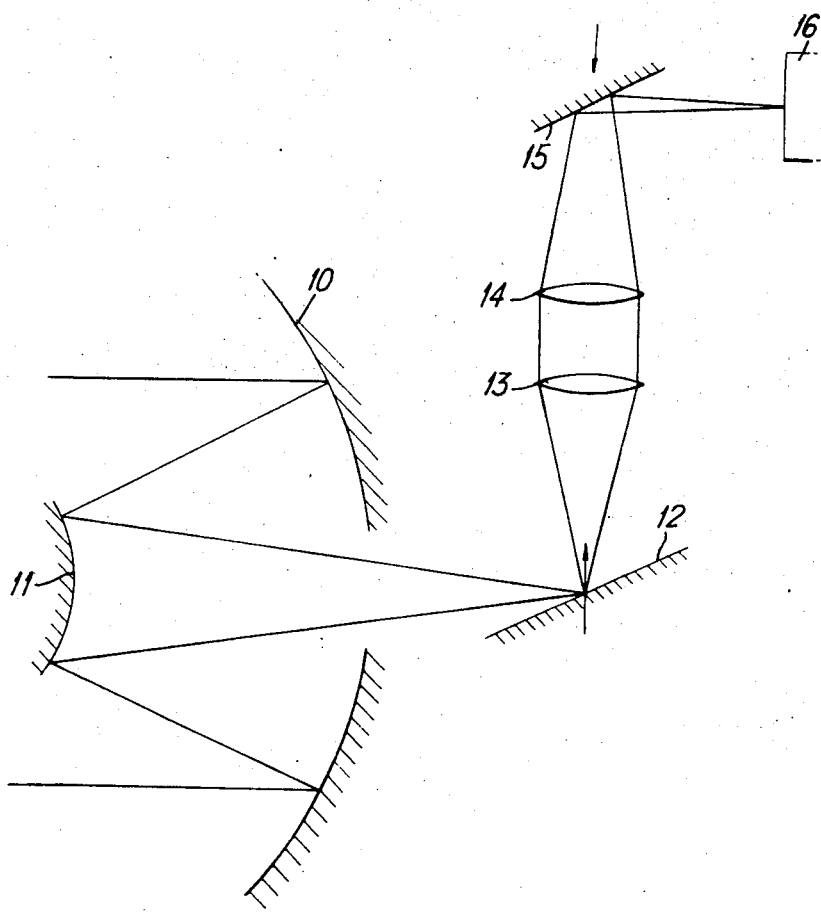
FIG. 1 is a stabilized optical system according to the present invention.

In FIG. 1, a gimbal (not shown) is rotatably mounted on its outer axis to a moving vehicle (not shown). An objective system in the form of a Cassegrainian mirror system having first and second mirrors 10 and 11 respectively, is rotatably mounted on the inner gimbal axis and is positioned such that the focal point of the objective system is substantially co-incident with the intersection of inner and outer gimbal axes. A plane mirror 12 is also rotatably mounted about the inner gimbal axis, the reflecting surface of the mirror 12 containing the inner gimbal axis. The mirror 12 is geared (at a 2:1 ratio) to the objective system so that image-forming light rays arriving at the mirror 12 will always be projected along the outer gimbal axis irrespective of the angular position of the objective system. A transfer optic system comprising two lenses 13 and 13 and a mirror 15 is located along the outer gimbal axis but is secured to the body of the vehicle so that any image-forming rays appearing on the mirror 12 are projected on to a camera tube 16 located at the image plane and mounted on the vehicle.

In operation, the objective system is positioned along the line of sight of an object. The image of the object is projected via the Cassegrainian mirror system to the mirror 12, through the transfer optic system 13, 14 and 15 to the camera tube 16. If the vehicle is subjected to some sudden movement servo-motors (not shown) are activated suitably to rotate the gimbal to compensate for the movement of the vehicle and thereby retain the original line of sight. The inertia of the gimbal and the objective system are sufficient to avoid errors in the line of sight due to high-frequency vibration of the vehicle frame. Also, as the focal point of the objective system is substantially co-incident with the reflecting surface of the mirror 12, the effect of small errors in the angular position of the mirror is minimized.

It will be appreciated that rotation of the image due to movement of the gimbal about the outer axis may be compensated for by rotation of the camera tube 16 or by use of a dove prism if the length of optical path between the mirror 12 and camera tube 16 permits.

Figure 2:
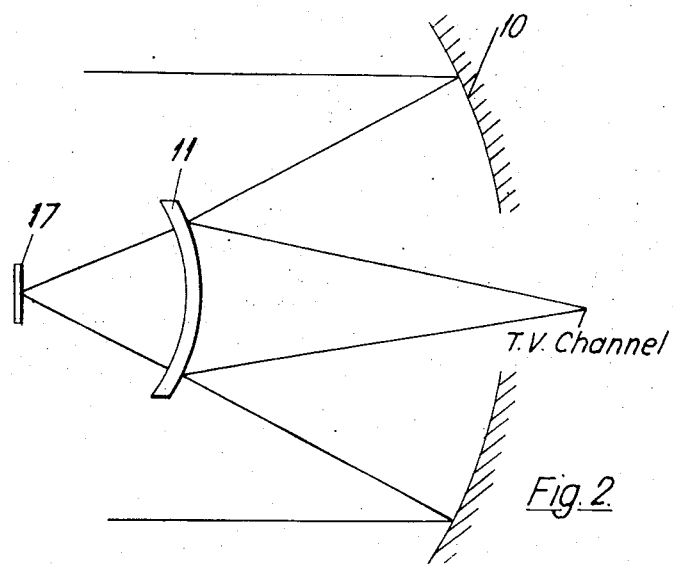
FIG. 2 shows a modification of a detail.

In FIG. 2, the second objective mirror 11 of the Cassegrainian mirror system is a dichroic mirror which reflects visible light but transmits laser signals. A laser receiver 17 is located behind the mirror 11 to receive the laser signals.

Figure 3:
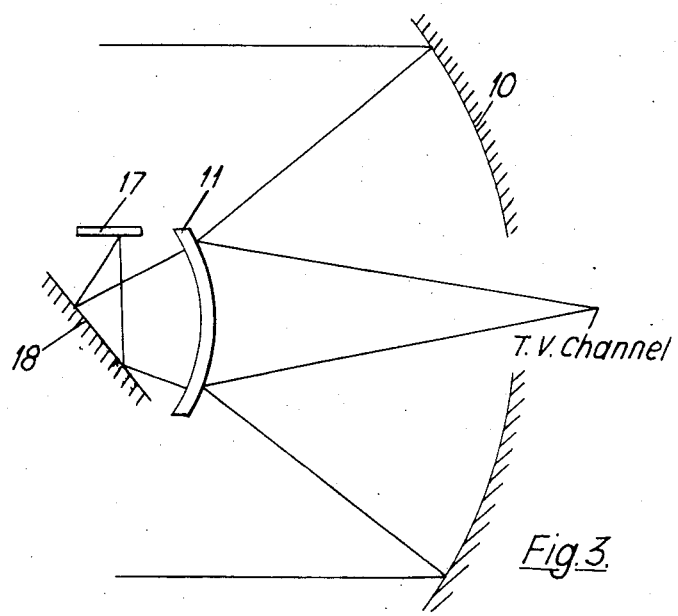
FIG. 3 shows a further modification.

In FIG. 3, the second objective mirror 11 is again dichroic but a mirror 18 is located behind the mirror 11 and reflects the laser signals transmitted by the mirror 11 on to the laser receiver 17.

Figure 4:
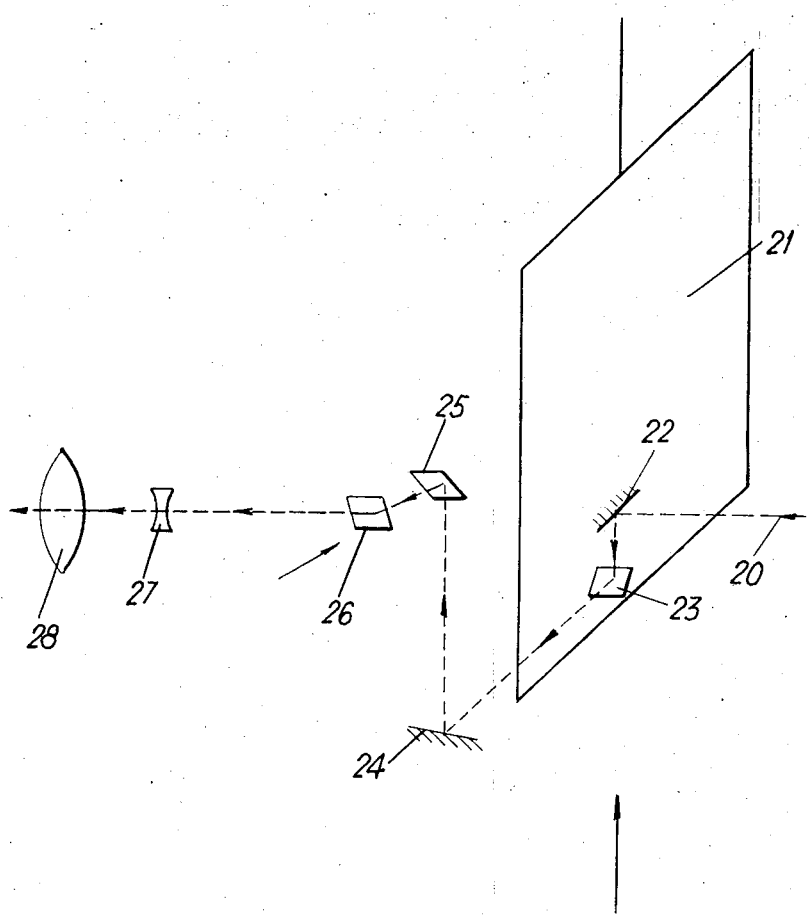
FIG. 4 shows the path taken by a laser signal for transmission by the system of FIG. 1.

In FIG. 4, a laser transmitter (not shown) which is secured to the vehicle transmits a laser beam 20 which is reflected along the outer axis of the gimbal 21 by a mirror 22 fixed to the vehicle. The laser beam 20 is then reflected by a series of mirrors 23–25 mounted on the gimbal 21 and is then reflected by a mirror 26 through lenses 27 and 28 all of which are connected to the objective system of FIG. 1, so that the laser beam 20 is transmitted parallel to the line of sight of the objective system. Alternatively, the laser beam may be reflected by further mirrors so that it is transmitted co-linear with the line of sight. Since the laser beam is associated with the gimbal and the objective system (not shown), the laser beam will also be stabilized.

Figure 7:
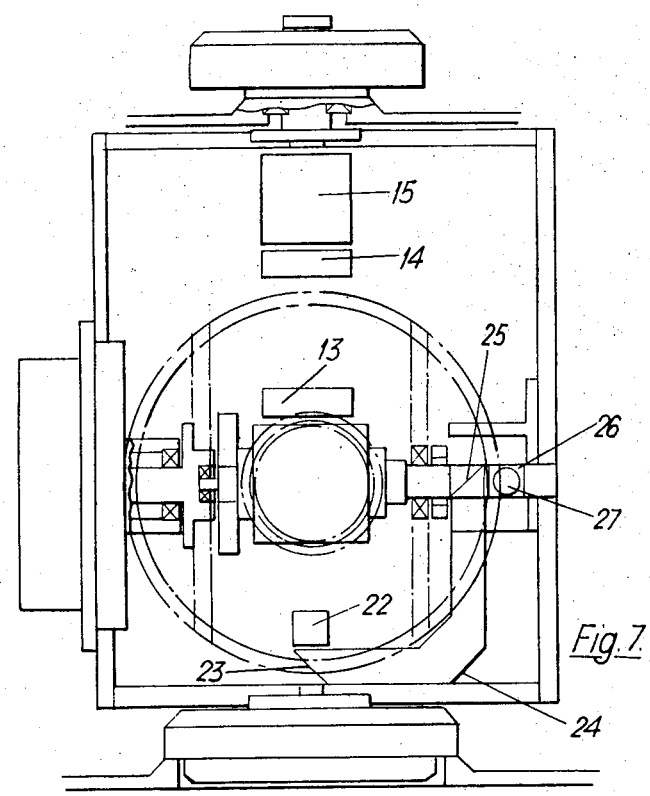

In FIGS. 5, 6 and 7, the apparatus hereinbefore described is shown in mechanical detail with the parts numbered accordingly, the laser transmitter being designated by the numeral 29, the driving connection between the mirror 12 and the objective system being denoted by the numeral 30, and the said inner gimbal axis being denoted X—X.

The window on the vehicle, through which the bundle of light rays are transmitted, is hemispherical, the radius of the hemisphere being centered at the intersection of the axes. This makes the angle of incidence of the light rays independent of the angular position of the objective system.

By virtue of the above described optical system a stabilized optical head which is more compact than hitherto may be provided. It will however be understood that various modifications may be made, for example, the objective system could utilize a simple lens or a combination of such lenses, and where the received bundle of light rays includes a laser signal this could be removed by providing a dichroic mirror or even a beamsplitter between the mirror 12 and the camera tube 16 of FIG. 1.

What I claim is:

1. A stabilized optical system comprising a servo-stabilized platform mounted on a support for rotation about a first axis, an objective system secured to said platform, and a mirror mounted on said platform for rotation about said first axis, the reflecting surface of said mirror containing said first axis, the objective system being so located that the focal point thereof lies on said reflecting surface and the first axis passing through said focal point, and a driving connection between the mirror and the platform whereby the angular movement of the mirror is related to that of the objective system so that a light beam received at said objective system is projected by said mirror along a second axis which is fixed in position with respect to the support.

2. An optical system according to claim 1, wherein said support is the outer member of a gimbal and said first axis is the inner axis of said gimbal, the gimbal being rotatable about its outer axis.

3. An optical system according to claim 1, wherein the projected light beam is received by a camera tube.

4. An optical system according to claim 3, wherein the camera tube is rotatable by servo-motors to compensate for rotation of the light beam in the projection system.

5. An optical system according to claim 1, wherein the objective system is a Cassegrainian mirror system.

6. An optical system according to claim 1, including means for separating visible light and laser light when a bundle of light beams are received which includes a laser signal.

7. An optical system according to claim 6, wherein the light separation means is a dichroic mirror used as the second objective mirror of a Cassegrainian mirror system which forms the objective system.

8. An optical system according to claim 1, including a laser transmitting device which transmits a laser beam through a projection lens system, part of which is mounted on said platform and thereby projects a laser beam parallel with or co-linear with the rays of incident light received at the objective system.

* * * * *

Notice of Adverse Decision in Interference

In Interference No. 99,323, involving Patent No. 3,698,790, P. J. Berry, STABILISED OPTICAL SYSTEMS, final judgment adverse to the patentee was rendered July 25, 1977, as to claims 1 and 3.

[*Official Gazette December 20, 1977.*]